(12) United States Patent
Kawamura et al.

(10) Patent No.: US 7,913,059 B2
(45) Date of Patent: Mar. 22, 2011

(54) INFORMATION PROCESSING DEVICE, DATA TRANSFER METHOD, AND INFORMATION STORAGE MEDIUM

(75) Inventors: Yuji Kawamura, Kanagawa (JP); Takeshi Yamazaki, Kanagawa (JP)

(73) Assignee: Sony Computer Entertainment Inc., Tokyo (JP)

(*) Notice: Subject to any disclaimer, the term of this patent is extended or adjusted under 35 U.S.C. 154(b) by 425 days.

(21) Appl. No.: 11/834,074

(22) Filed: Aug. 6, 2007

(65) Prior Publication Data

US 2008/0098198 A1 Apr. 24, 2008

(30) Foreign Application Priority Data

Sep. 5, 2006 (JP) ................................ 2006-240743

(51) Int. Cl.
*G06F 12/00* (2006.01)
(52) U.S. Cl. ...................................... 711/206; 711/154
(58) Field of Classification Search .................. 711/154, 711/206
See application file for complete search history.

(56) References Cited

U.S. PATENT DOCUMENTS

| 5,442,802 | A | * | 8/1995 | Brent et al. ................... 718/100 |
| 5,469,534 | A | * | 11/1995 | Brindle et al. ............... 358/1.15 |
| 5,493,635 | A | * | 2/1996 | Brindle et al. ............... 358/1.15 |
| 5,526,469 | A | * | 6/1996 | Brindle et al. ................ 358/1.9 |
| 7,509,391 | B1 | * | 3/2009 | Chauvel et al. ............... 709/214 |
| 2007/0130372 | A1 | * | 6/2007 | Irish et al. ......................... 710/5 |

* cited by examiner

*Primary Examiner* — Reba I Elmore
(74) *Attorney, Agent, or Firm* — Matthew B. Dernier, Esq.; Gibson & Dernier LLP

(57) ABSTRACT

The present invention has been conceived in view of the above described situation, and an object of the invention is to provide an information processing device, data transfer method and information storage medium that can commence data transfer to an I/O device immediately, and can stably exhibit data transfer performance. In an information processing device provided with hardware for sharing an address translation table, for translating logical addresses of a memory to physical addresses, between a main processor and a sub-processor, one of the sub-processors is caused to function as means for receiving a transfer request designating a logical address of the memory, means for translating the logical address that has been designated in the transfer request to a physical address using the shared address translation table, and means for executing transfer processing for data stored in the memory 14 according to the translated physical address.

5 Claims, 3 Drawing Sheets

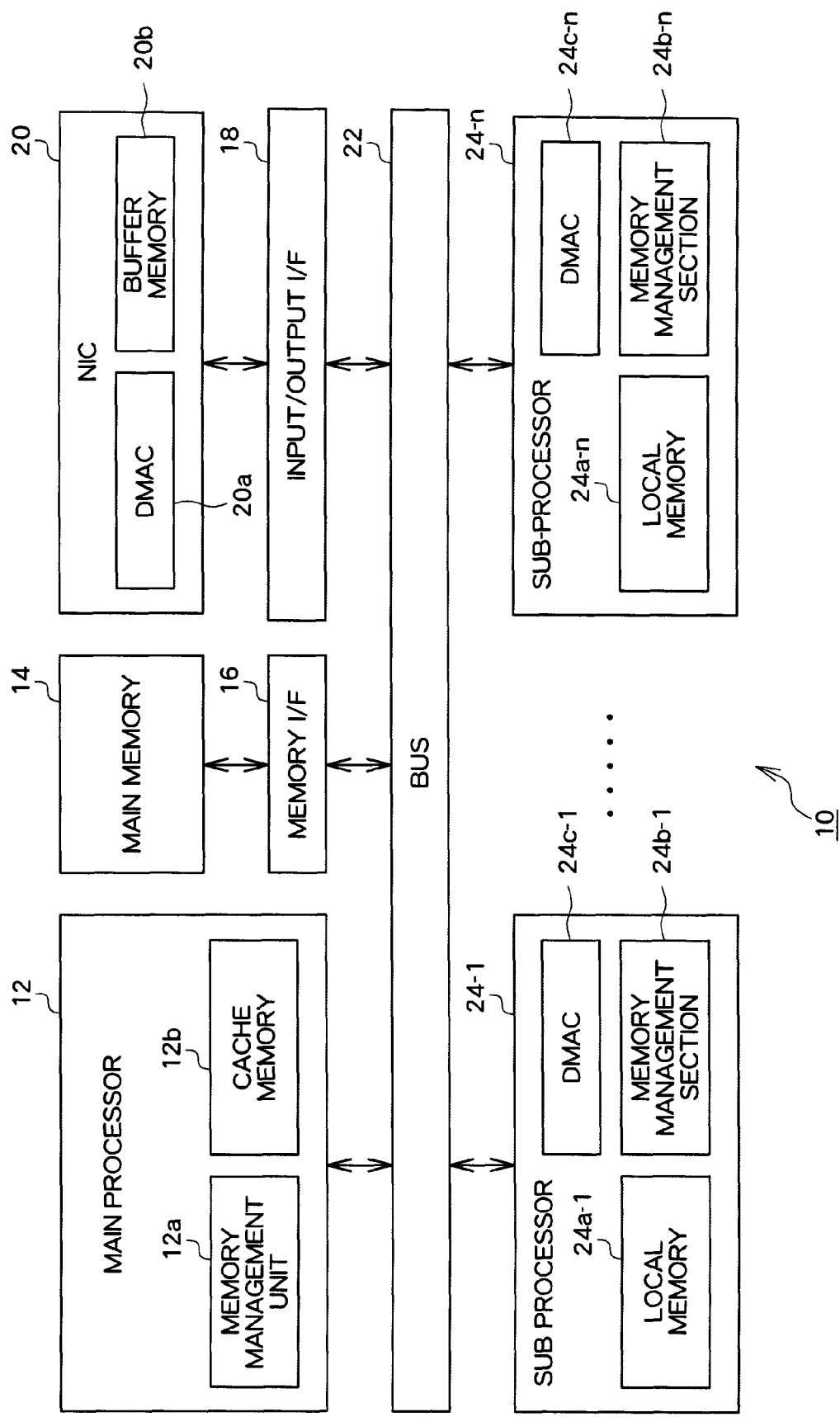

INFORMATION PROCESSING DEVICE, DATA TRANSFER METHOD, AND INFORMATION STORAGE MEDIUM

BACKGROUND OF THE INVENTION

The present invention relates to an information processing device, a data transfer method, and an information storage medium.

In the event of a processor transferring data in a main memory to an I/O device such as an NIC (Network Interface Card), if the processor is already executing another program, there is a potential problem that it will not be possible to demonstrate sufficient transfer performance such as latency and transfer rate. It has therefore, been considered to provide dedicated hardware for data transfer at the I/O device side, so that it is made possible to stably exhibit transfer performance.

However, in order for the above-described dedicated hardware to directly access data in the main memory, it is necessary for an address translation table, for translating the logical address of the data to a physical address, to be set beforehand. With the above-described structure therefore, it is necessary to create a new address translation table in the dedicated hardware before data transfer, and there is a problem in that it is not possible to execute data transfer immediately as the need arises.

SUMMARY OF THE INVENTION

The present invention has been conceived in view of the above-described situation, and an object of the invention is to provide an information processing device, data transfer method and information storage medium that can commence data transfer to an I/O device immediately, and can stably exhibit data transfer performance.

In order to solve the above described problems, an information processing device of the present invention comprises a memory, a main processor, at least one sub-processor, an I/O device, and address translation table sharing means, for sharing an address translation table, for translating logical addresses of the memory to physical addresses, between the main processor and the at least one sub-processor, wherein the one sub-processors is provided with request receiving means for receiving a transfer request designating a logical address of the memory, address translation means for translating the logical address designated by the transfer request to a physical address using the shared address translation table, and transfer process execution means for executing transfer process for data stored in the memory to the I/O device in accordance with the translated physical address.

It is also possible for the one sub-processor to be provided with a local memory. In this case, it is possible for the transfer process execution means to include means for reading out data from the physical address translated by the address translation means, and storing data in the local memory based on the data, and means for sending a transfer request designating the physical address of data stored in the local memory to the I/O device, and for the I/O device to read out data from the local memory in accordance with a physical address designated by the transfer request received from the one sub processor.

Also, a data transfer method of the present invention is performed by a computer comprising a memory, a main processor, at least one sub-processor, an I/O device, and address translation table sharing means, for sharing an address translation table, for translating logical addresses of the memory to physical addresses, between the main processor and the at least one sub-processor, and executes, in the one sub-processor, a step of receiving a transfer request designating a logical address of the memory, a step of translating the logical address designated by the transfer request to a physical address using the shared address translation table, and a step of executing a transfer process for data stored in the memory in accordance with the translated physical address.

Also, an information storage medium of the resent invention stores a program, executed by a computer comprising a memory, a main processor, at least one sub-processor, an I/O device, and address translation table sharing means, for sharing an address translation table, for translating logical addresses of the memory to physical addresses, between the main processor and the at least one sub-processor, and the program cause the at least one sub-processor to function as means for receiving a transfer request designating a logical address of the memory, means for translating the logical address designated by the transfer request to a physical address using the shared address translation table, and means for executing a transfer process for data stored in the memory in accordance with the translated physical address. This program can be stored in an information storage medium capable of being read by various types of computer.

BRIEF DESCRIPTION OF THE DRAWINGS

FIG. 1 is a structural drawing of an information processing device of one embodiment of the present invention.

DESCRIPTION OF PREFERRED EMBODIMENTS

Figure 2A:
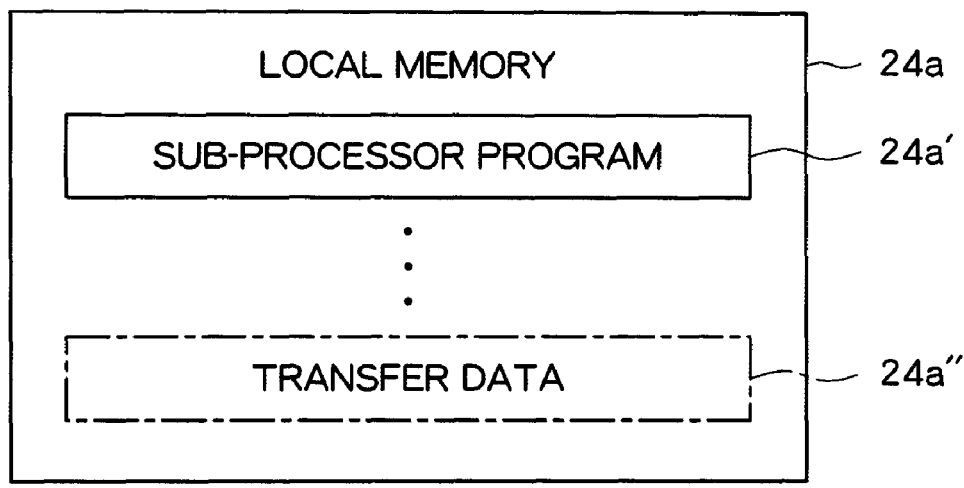
FIG. 2 is a drawing showing stored content of the local memory and the main memory.

One embodiment of the present invention will be described in the following based on the drawings.

FIG. 1 is a structural drawing of an information processing device of the present invention. As shown in FIG. 1, this information processing device 10 includes a main processor 12 and a plurality of sub-processors 24-1 to 24-n, and is constructed as an asymmetric multi-core processor. The main processor 12 and the plurality of sub-processors 24-1 to 24-n are all connected to a bus 22, and data can be mutually sent and received among the processors via this bus 22. A main memory 14 is connected to the bus 22 via a memory interface 16, and an NIC 20 as an I/O device is connected to the bus 22 via an input output interface 18.

The main processor 12 is program execution means for executing programs, such as an operating system and performing task allocation to the sub-processors 24-1 to 24-n, and contains a memory management unit 12a and a cache memory 12b. The memory management unit 12a is hardware for executing processing for translating a logical address, that is generated by the main processor 12 or received externally, into a physical address of the main memory 14 and carries out this translation processing in accordance with an address translation table stored in the main memory 14. The address translation table is a table which associates logical addresses with physical addresses, and is made up of page groups of a specified size such as 4 KB. Therefore, the memory management section 12a is provided with a memory for storing the necessary pages, of these pages, and when a logical address generated by the main processor 12 does not exist in a page stored in the memory, another page is read out from the main memory 14 and the memory contents updated. Also, the cache memory 12b is a memory for temporarily storing commands and data to be processed by the main processor 12.

The sub-processors 24 (24-1 to 24-n) are ancillary program execution means containing local memory 24a, a memory management section 24b and a DMAC (Direct Memory Access Controller). The local memory 24a, as shown in FIG. 2(a) is used to store a program 24a' executed by the sub processor 24, and temporarily stored data that is the object of processing. The memory control section 24b also provides the same functions as the memory management section 12a. More specifically, the memory management unit 24b is hardware for executing processing for translating a logical address, that is generated by the sub processor 24 or received externally, into a physical address of the main memory 14 and carries out this translation processing in accordance with an address translation table stored in the main memory 14. The memory management section 24b is provided with a memory for storing the necessary pages of the address translation table, and when a logical address that requires translation does not exist in a page stored in the memory, another page is read out from the main memory 14 and the memory contents updated. The DMAC 24c is also a control unit for direct access to the main memory 14, without going via the main processor 12. With this embodiment, in particular, of the sub-processors 24-1 to 24-n, a transfer task for transferring transfer data stored in the main memory 14 to the NIC 20 is allocated to the sub-processor 24-1, and in this way it is possible to execute high speed data transfer without imposing a processing load on the main processor 12. Therefore, processing to transfer the transfer data stored in the main memory 14 to the NIC 20 is implemented by storing a data transfer program in the local memory 24a-1 as a sub-processor program 24a', and having the sub-processor 24-1 execute this data transfer program. Also, at the time of this transfer task, as shown in FIG. 2(a), data to be transferred to the NIC 20 that is stored in the main memory 14, that is, transfer data 24a'', is temporarily stored in the local memory 24a-1 of the sib-processor 24-1 (described in detail later).

Figure 2B:
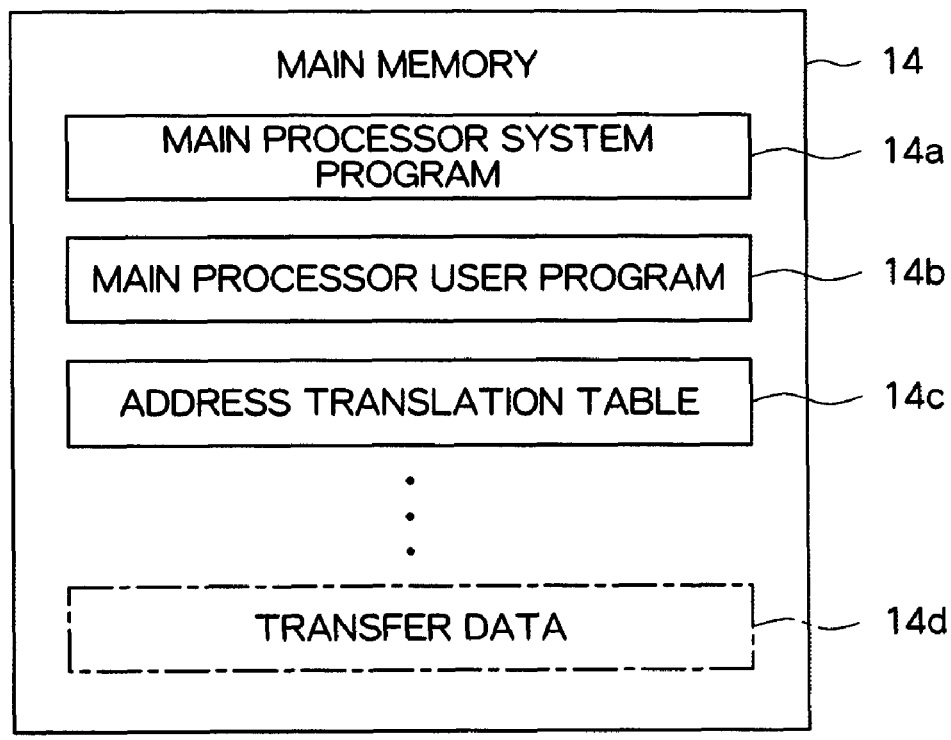

As shown in FIG. 2(b), a system program 14a, such as an OS (operating system) executed by the main processor 12, a user program 14b executed by the main processor 12, and an address translation table 14c are stored in the main memory 14. The address translation table 14c is updated by the main processor system program 14a, and when the table has been updated this fact is also notified to the sub-processors 24-1 to 24-n, and the latest address translation table 14c is shared by the main processor 12 and the sub-processors 24-1 to 24-n. Data generated by the main processor 12 and the sub-processors 24-1 to 24-n that is to be transferred to the NIC 20, namely transfer data 14d, is also stored in the main memory 14. As has been described above, this transfer data 14d is temporarily transferred to the sub-processor 24-1 at the time of transfer to the NIC 20, and is stored in the local memory 24a-1.

The NIC 20 is an interface for connecting this information processing device 10 to a data communication network such as a LAN (Local Area Network), and contains a DMAC 20a and a buffer memory 20b. The DMAC 20a is a control unit for direct access to the main memory 14 and the local memory 24a of each sub-processor 24, and stores received data in the buffer memory 20b. The buffer memory 2b is a FIFO (First In First Out) buffer, and data stored in the buffer memory 20b are sequentially sent to the network.

Figure 3:
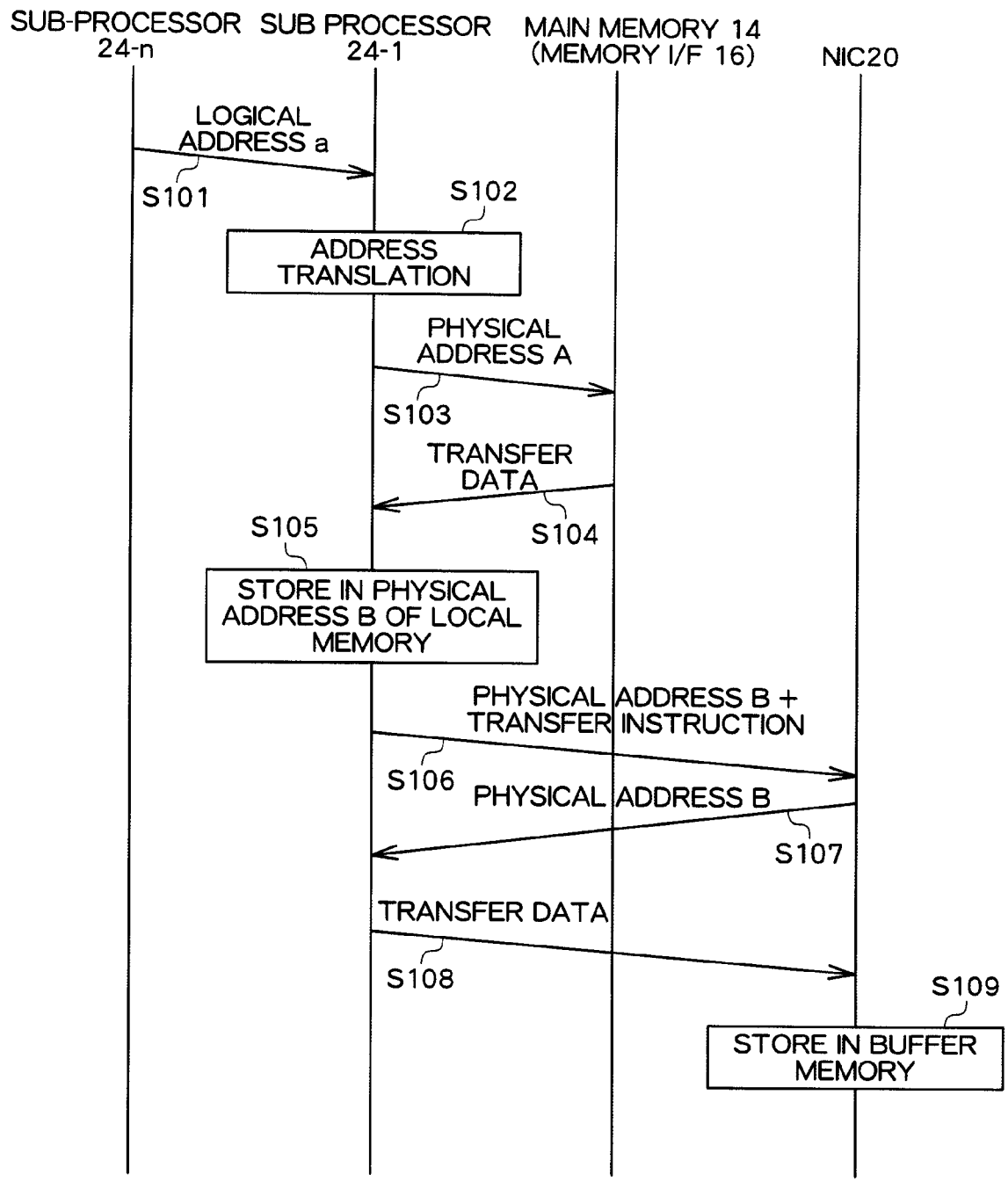
FIG. 3 is a sequence drawing showing a data transfer process.

Here, data transfer processing of the information processing device 10 will be described. FIG. 3 is a sequence diagram for data transfer processing when data transfer to the sub-processor 24-1, which is a processor for data transfer, is carried out after transfer data 14d has been stored in the main memory 14 by a sub-processor N. As shown in FIG. 3, if a data transfer request designating of logical address (here made "a") of transfer data 14d is transmitted by the sub-processor 24-n via the bus 22 to the sub-processor 24-1 (S101), the sub-processor 24-1 receives this data transfer request. The memory management section 24b-1 of the sub-processor 24-1 translates the logical address "a" designated in the data transfer request to a physical address "A" based on some pages of the address translation table 14c stored in the internal memory (S102). This physical address "A" is then transmitted to the memory interface 16 (S103), and transfer data 14d stored at the physical address "A" of the main memory 14 is received (S104). Next, the sub-processor 24-1 stores the received transfer data 14d in the local memory 24a-1 (S105). Then, a data transfer instruction designating a physical address (here made "B") for a storage destination is transmitted via the bus 22 to the NIC 20 (S106). The NIC 20 transits the physical address "B" to the sub-processor 24-1 in response to this instruction (S107), and receives transfer data 24a'' (namely transfer data 14d) returned from the sub-processor 24-1 (S108). The thus received transfer data 24a'' is then stored in the buffer memory 20b and used in communication processing (S109).

According to the above described information processing device 10, since a single sub-processor 24-1 constituting a multi-core processor is allocated solely to data transfer, it is possible to implement data transfer at high speed and with low latency regardless of the operating state of the main processor 12. Also, since data transfer is implemented using an address translation table 14c that is shared between the main processor 12 and the sub-processor 24 due to the hardware architecture of the information processing device 10, it is possible to carry out data transfer immediately as the need arises.

Incidentally, the present invention is not limited to the above described embodiment, and various modifications are possible. For example, with the above described embodiment an NIC 20 has been adopted as the I/O device, but it is also possible to have another I/O device such as a hard disk storage device. Also, with the above described embodiment transfer data 14d stored in the main memory is stored as it is in the local memory 24a-1 of the sub-processor 24-1, but it is also possible, for example, to perform various translation processes such as encryption in the sub-processor 24-1, and after that store as transfer data 24a'', and transfer this translated data 24a'' to the NIC 20.

What is claimed is:

1. An information processing device, comprising:
   a memory;
   a main processor that executes programs and transfers a task that requires translating an address of the memory to at least one sub-processor;
   the at least one sub-processor;
   an I/O device; and
   address translation table sharing means, for sharing an address translation table, for translating logical addresses of the memory to physical addresses, between the main processor and the at least one sub-processor,
   wherein the at least one sub-processor comprises:
   request receiving means for receiving a transfer request designating a logical address of the memory;
   address translation means for translating the logical address designated by the transfer request to a physical address using the shared address translation table; and transfer process execution means for executing transfer process for data stored in the memory to the I/O device in accordance with the translated physical address, wherein the sub-processor is dedicated to a task of translating addresses of the memory and transferring data addressed thereby to the I/O device using the request receiving means, address translation means and transfer process execution means when the main processor does not perform such translation of the addresses of the memory.

2. The information processing device of claim 1, wherein:
the at least one sub-processor comprises a local memory,
the transfer process execution means includes:
(i) means for reading out data from the physical address translated by the address translation means, and storing data in the local memory based on the data, and
(ii) means for sending a transfer request designating a physical address of data stored in the local memory to the I/O device, and
the I/O device reads out data from the local memory in accordance with the physical address designated by the transfer request received from the one sub processor.

3. A data transfer method, performed by a computer comprising: a memory; a main processor; at least one sub-processor; an I/O device; and address translation table sharing means, for sharing an address translation table, for translating logical addresses of the memory to physical addresses, between the main processor and the at least one sub-processor, the method comprising:
receiving at the sub-processor from the main processor that executes programs and transfers a task that requires translating an address of the memory to the sub-processor, a transfer request designating a logical address of the memory;
translating at the sub-processor, the logical address designated by the transfer request to a physical address using the shared address translation table; and
executing by the sub-processor, a transfer process for data stored in the memory in accordance with the translated physical address wherein the sub-processor is dedicated to a task of translating addresses of the memory and transferring data addressed thereby to the I/O device using the request receiving means, address translation means and transfer process execution means when the main processor does not perform such translation of the addresses of the memory.

4. The method of claim 3, further comprising receiving at the sub-processor from the main processor, an allocation of a transfer task for transferring data stored in the main memory.

5. An information storage medium storing a program, executed by a computer comprising: a memory; a main processor; at least one sub-processor; an I/O device; and address translation table sharing means, for sharing an address translation table, for translating logical addresses of the memory to physical addresses, between the main processor and the at least one sub-processor, the program causing the at least one sub-processor to function as:
means for receiving a transfer request designating a logical address of the memory from a main processor that executes programs and transfers a task that requires translating an address of the memory to the sub-processor;
means for translating the logical address designated by the transfer request to a physical address using the shared address translation table; and
means for executing a transfer process for data stored in the memory in accordance with the translated physical address, wherein the sub-processor is dedicated to a task of translating addresses of the memory and transferring data addressed thereby to the I/O device using the request receiving means, address translation means and transfer process execution means when the main processor does not perform such translation of the addresses of the memory.

* * * * *